(12) United States Patent
Von Ahnen et al.

(10) Patent No.: US 6,400,717 B1
(45) Date of Patent: Jun. 4, 2002

(54) DEVICE FOR BOOTING A MULTIPROCESSOR EMBEDDED SYSTEM AND METHOD OF OPERATION

(75) Inventors: Michael J. Von Ahnen; Sudhindra P. Herle, both of Plano, TX (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/174,030

(22) Filed: Oct. 16, 1998

(51) Int. Cl.[7] .......................... H04L 12/28; H04L 12/56
(52) U.S. Cl. ..................... 370/395; 370/466; 714/36
(58) Field of Search .............................. 370/252, 241, 370/244, 250, 395, 465, 466, 474; 709/222; 713/1, 2; 714/25, 36

(56) References Cited

U.S. PATENT DOCUMENTS

| | | | |
|---|---|---|---|
| 4,590,556 A | | 5/1986 | Berger et al. |
| 4,679,166 A | | 7/1987 | Berger et al. |
| 5,600,644 A | * | 2/1997 | Chang et al. ............... 370/404 |
| 5,818,842 A | * | 10/1998 | Burwell et al. ............. 370/397 |
| 5,848,293 A | * | 12/1998 | Gentry ........................ 395/825 |
| 5,867,702 A | * | 2/1999 | Lee ............................. 395/651 |
| 6,064,674 A | * | 5/2000 | Doidge et al. .............. 370/398 |

* cited by examiner

Primary Examiner—Ricky Ngo
(74) Attorney, Agent, or Firm—John C. Han

(57) ABSTRACT

There is disclosed, for use in a data processing device containing a master processor and a slave processor, a mode selection circuit capable of selecting the operating mode of the slave processor. The mode selection circuit comprises a mode determination circuit capable of determining the current operating mode of the master processor and a mode control circuit capable of causing the slave processor to operate in a selected operating mode in response to the current operating mode of the master processor. The mode selection circuit causes the slave processor to boot up to a test program stored in a ROM coupled to the slave processor whenever the master processor is in a test mode. If the master processor is in a system application mode, the mode selection circuit causes the slave processor to execute a system application program stored in a RAM coupled to the slave processor.

20 Claims, 3 Drawing Sheets

DEVICE FOR BOOTING A MULTIPROCESSOR EMBEDDED SYSTEM AND METHOD OF OPERATION

TECHNICAL FIELD OF THE INVENTION

The present invention is directed, in general, to telecommunications equipment and, more specifically, to a system and method for controlling the initialization and operation of a multi-processor communications system.

BACKGROUND OF THE INVENTION

Information systems have evolved from centralized mainframe computer systems supporting a large number of users to distributed computer systems based on local area network (LAN) architectures. As the cost-to-processing-power ratios for desktop PCs and network servers have dropped precipitously, LAN systems have proved to be highly cost effective. As a result, the number of LANs and LAN-based applications has exploded.

A consequential development relating to the increased popularity of LANs has been the interconnection of remote LANs, computers, and other equipment into wide area networks (WANs) in order to make more resources available to users. However, a LAN backbone can transmit data between users at high bandwidth rates for only relatively short distances. In order to interconnect devices across large distances, different communication protocols have been developed. These include X.25, ISDN, frame relay, and ATM, among others.

Frame relay has proved to be one of the most popular communication protocols. Frame relay provides up to T3 level speeds (from 56 Kbps up to about 45 Mbps) using packet switching technology. It is optimized for the transfer of protocol-oriented data in packets of variable length. Data is sent in high-level data link control packets, called "frames". A typical frame includes a "header", comprising an address block and a control block, a "payload" or data block that is the actual data to be transferred from endpoint to endpoint, and a CRC error correction block.

The need for higher speed communication protocols that are less susceptible to switching delays has led to the development of the asynchronous transfer mode (ATM) telecommunications standard. ATM was originally intended as a service for the broadband public telephone network. Although designed primarily for the high-speed transfer of video and multimedia information, the most popular applications for ATM so far have been data transmission. ATM switches are widely used as the backbone of large business networks and in wide area networks.

ATM provides speeds from 50 Mbps up to 10 Gbps using fast packet switching technology for high performance. ATM uses small fixed-size packets, called "cells". A cell is a 53-byte packet comprising 5 bytes of header/descriptor information and a 48-byte payload of voice, data or video traffic. The header information contains routing tags and/or multi-cast group numbers that are used to configure switches in the ATM network path to deliver the cells to the final destination.

ATM is a relatively new technology and currently represents only a comparatively small percentage of the installed network infrastructure. Frame relay still remains as a dominant portion of the installed network infrastructure. Additionally, since many information systems may never need video or other high bandwidth applications, it is unlikely that every LAN or WAN system will need to be converted to an ATM system. Hence, frame relay and ATM will likely coexist for a long period of time.

In order to allow frame relay systems and ATM systems to communicate with one another, a host of well-known interfaces have been developed to interconnect frame relay based networks with ATM based networks. These frame relay-to-ATM interfaces typically include high-level data link control (HDLC) interfaces for sending and receiving frames from frame relay-based networks/devices and segmentation and reassembly (SAR) interfaces for sending and receiving cells from ATM networks/devices.

ATM switches and frame relay switches use multiple data processors to transfer and process data frames and ATM cells and to provide the power needed to handle very large data traffic loads. These data processors are frequently implemented in hierarchical architectures wherein one processor, frequently referred to as "master" processor or "primary" processor, controls the operations of one or more other processors, frequently referred to as "slave" processors or "secondary" processors.

Typically, the primary data processor sends data and/or assigns tasks to the secondary data processors in order to distribute work evenly and accomplish parallel processing. This leads to higher throughput rates. In general, the primary processor controls the initialization and operation of each of the secondary processors. The primary processor can control the operation of a secondary processor by loading the memory used by the secondary processor with data and applications selected by the primary processor.

For example, a frame-relay interface unit (FIU) in an ATM switch may contain a master processor that controls a group of protocol conversion circuit cards (e.g., frame relay-to-ATM converters), each of which contains a slave processor that receives instructions from the master processor. During a boot-up operation, the master processor may execute its own self-test program by reading a self-test program from a ROM associated with the primary processor. After the primary processor validates itself, the primary processor may load application programs into the RAM memories used by the slave processors to cause each slave processor to process data traffic.

There are problems inherent in this type of multiprocessor architecture, however. For example, in the ATM switch FIU described above the secondary processors do not have the ability to validate their own operation in a self-test mode, since the secondary processors are dependent on the primary processor for control. Thus, the secondary processors must be operational without first being tested. If a failure does occur in a secondary processor, it must be debugged in a time consuming process by the primary processor or by special purpose emulation hardware that tests the slave processor separately. Furthermore, as a practical consideration, the debug program for a secondary processor is not stored in the (relatively) small local memory used by the primary processor. Instead, the primary processor retrieves the debug program for the secondary processor from an external source, such as a memory located elsewhere in the ATM switch. If however, the device in which the primary and secondary processors are located is not coupled to the external source, then the secondary processors cannot be tested at all.

There is therefore a need in the art for multiprocessor systems that provide improved circuits and methods for validating the operation of slave processors controlled by a master processor. In particular, there is need for an improved multiprocessor system wherein a master processor can direct a slave processor to operate in a test mode, wherein the slave processors validates itself, or in a system mode, wherein the slave processor executes programs and processes data received from the primary processor.

SUMMARY OF THE INVENTION

To address the above-discussed deficiencies of the prior art, it is a primary object of the present invention to provide, for use in a data processing device containing a first processor and a second processor controllable by the first processor, a mode selection circuit capable of selecting an operating mode of the second processor comprising: 1) a mode determination circuit capable of determining a current operating mode of the first processor; and 2) a mode control circuit coupled to the mode determination circuit capable of causing the second processor to operate in a first selected operating mode.

According to one embodiment of the present invention, the second processor is coupled to a read-only memory (ROM) capable of storing a test program operable to test the second processor and a random-access memory (RAM) capable of storing an application program.

According to another embodiment of the present invention, the mode control circuit causes the second processor to execute the test program in the ROM in response to a determination by the mode determination circuit that the first processor is in a test mode.

According to yet another embodiment of the present invention, the mode control circuit causes the second processor to execute the application program in the RAM in response to a determination by the mode determination circuit that the first processor is in a system mode wherein the first processor processes data traffic under control of an application program.

According to still another embodiment of the present invention, the mode control circuit is a switch capable of coupling the ROM to data paths of the second processor.

According to a further embodiment of the present invention, the mode control circuit is a switch capable of coupling the RAM to data paths of the second processor.

According to a still further embodiment of the present invention, the mode determination circuit determines the current operating mode in response to an interrupt signal received from the first processor.

According to a yet further embodiment of the present invention, the mode determination circuit determines the current operating mode in response to a power reset signal received from the data processing device.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

Figure 1:
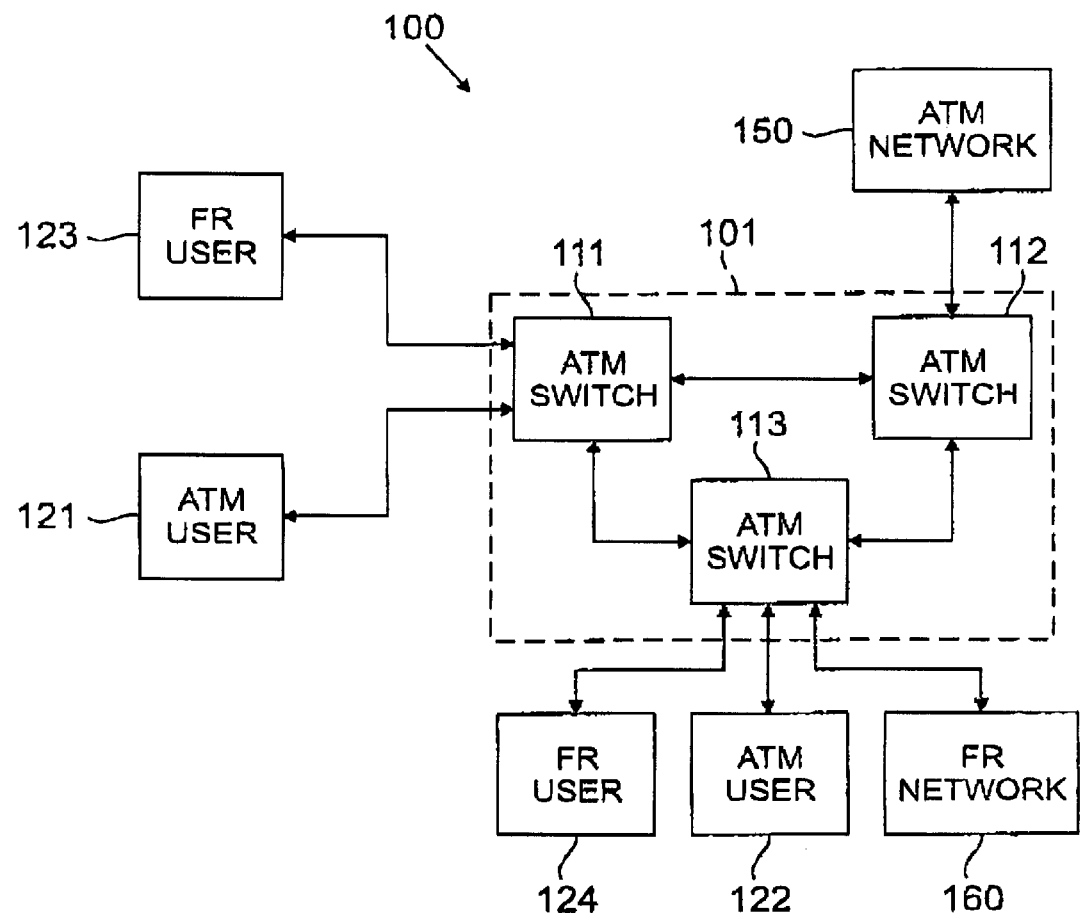
FIG. 1 illustrates an exemplary network infrastructure 100 that interconnects various end users, including, for example frame relay end users and ATM end users, in accordance with one embodiment of the present invention.
Figure 2:
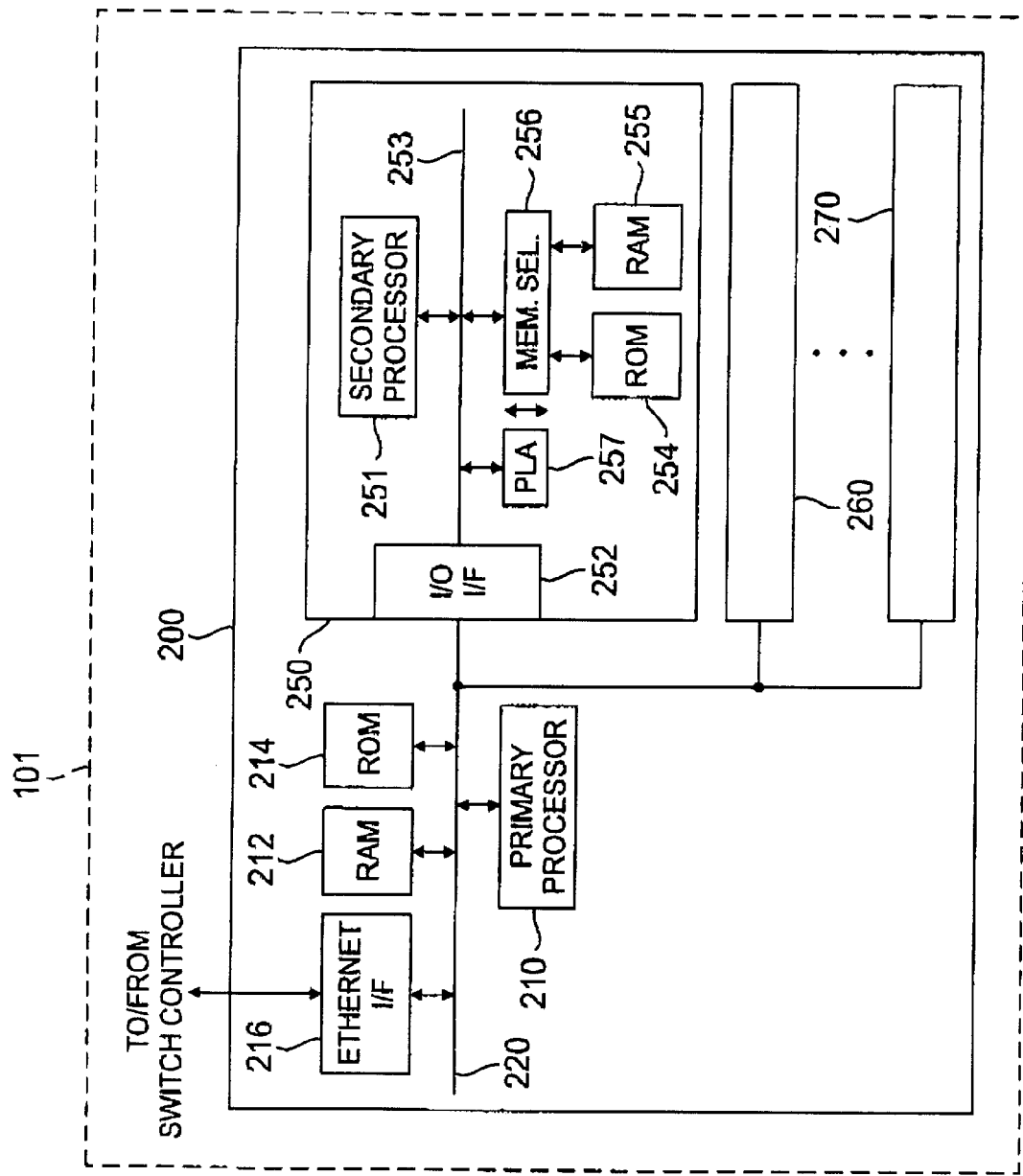
FIG. 2 illustrates an exemplary frame relay infrastructure unit (FIU) in an exemplary ATM switch in FIG. 1, in accordance with one embodiment of the present invention.
Figure 3:
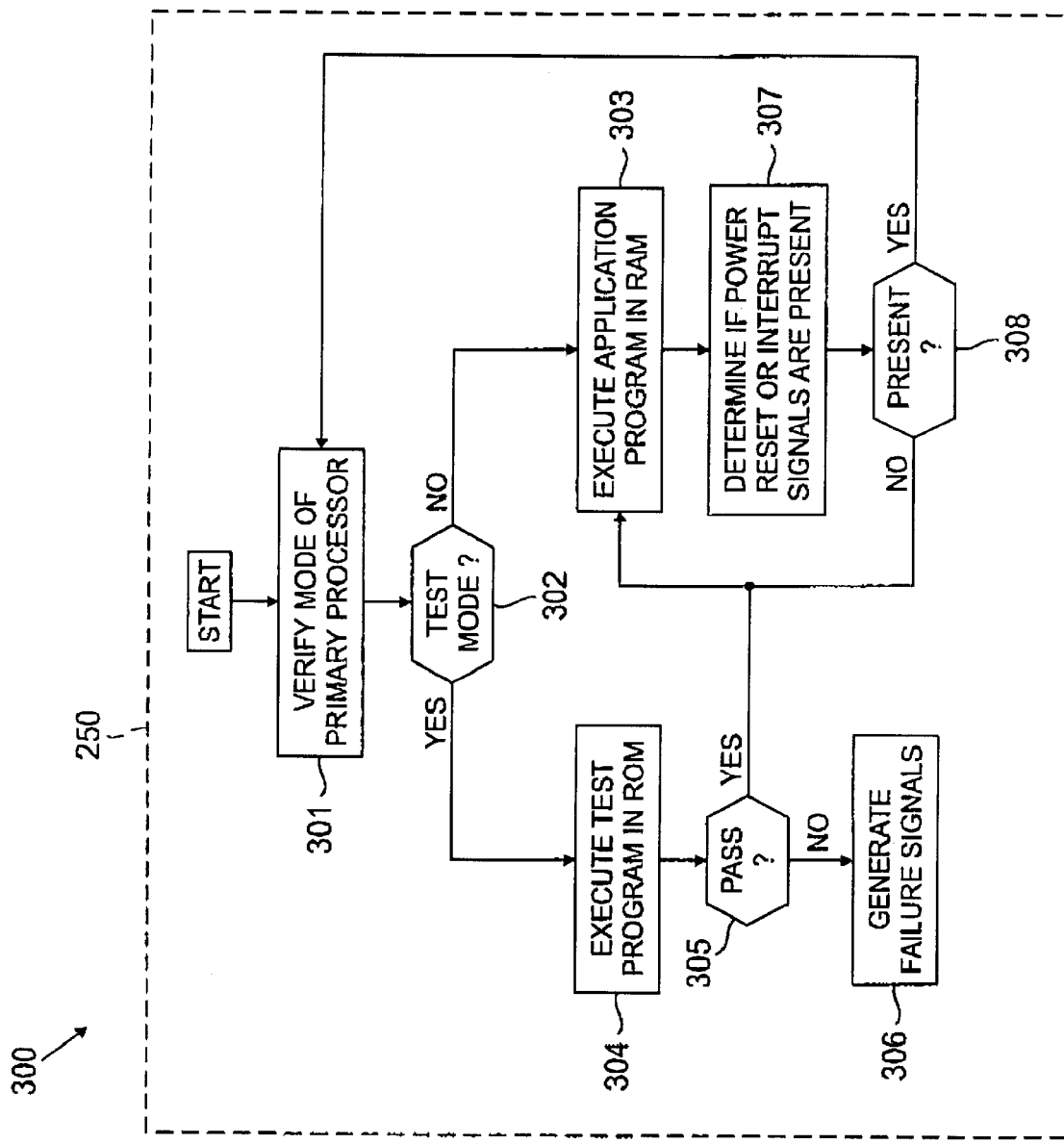
FIG. 3 is a flow diagram illustrating the operation of an examplary data traffic processing unit in accordance with one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably data communications device.

The following descriptions of the invention disclose a specific embodiment in which a multiprocessor system in accordance with the principles of the present invention is incorporated into an ATM switch. Those skilled in the art will understand that this is by way of example only and should not be construed to limit the types of devices in which the present invention may be implemented. In fact, the present invention may be implemented in any multiprocessor system in which one processor may control the operating modes of one or more other processors.

FIG. 1 illustrates an exemplary network infrastructure 100 that interconnects various end users, including, for example frame relay end users and ATM end users, in accordance with one embodiment of the present invention. Network infrastructure 100 comprises an ATM backbone network 101 that provides switching connectivity between a plurality of devices, including ATM users 121 and 122, frame relay users 123 and 124, an external ATM network 150, and an external frame relay network 160. ATM users 121 and 122 each may comprise any device capable of sending and/or receiving ATM cells. Likewise, frame relay users 123 and 124 each may comprise any device capable of sending and/or receiving frame relay data frames.

As indicated in FIG. 1, ATM switches 111–113 may receive data from external transmitting devices in different data protocol formats, including ATM cells and frame relay data frames. All of the received non-ATM data frames must be converted to ATM cells in order to be transferred between ATM switches 111–113 within ATM backbone network 101. Similarly, at the destination end-user device, the ATM cells must be converted to the data format of the receiving end-user device, if it is not an ATM device. To handle these protocol conversions, each of ATM switches 111–113 employ various types of interface units that convert non-ATM data to ATM cells, and vice versa.

For example, one or more of ATM switches 111–113 may contain a frame relay interface unit (FIU) that is responsible for converting frame relay data frames into ATM cells and converting ATM cells into frame relay data frames. To accomplish this, the FIU uses multiple I/O data processors, such as INTEL7™ 80960 processors, to convert the data traffic in both directions. An advantageous arrangement of the data processors typically includes a hierarchical arrangement in which a primary/master processor controls one or more secondary/slave processors.

FIG. 2 illustrates an exemplary frame relay infrastructure unit (FIU) 200 in ATM switch 101, in accordance with one embodiment of the present invention. FIU 200 comprises a primary processor 210, read-only memory (ROM) 214, random-access memory (RAM) 212 and Ethernet interface (IF) 216, which are coupled together by communications bus 220. FIU 200 further comprises a plurality of data traffic processing units 250, 260 and 270 that are controlled by primary processor 210.

Exemplary data traffic processing unit 250 comprises secondary processor 251, I/O interface (IF) 252, communications bus 253, read-only memory (ROM) 254, random-access memory (RAM) 255, memory selector 256, and programmable logic array (PLA) 257. Data traffic processing units 260 and 270 are functionally equivalent to data traffic processing unit 250. For this reason, the descriptions that follow of the operation of data traffic processing unit 250 apply also to data traffic processing units 260 and 270. Separate descriptions of the operations of data traffic processing units 260 and 270 are omitted in order to avoid redundancy and to maintain brevity.

In an advantageous embodiment of the present invention, during a boot-up (or startup) operation, primary processor 210 initially reads the boot program from a fixed address in ROM 214 and executes a self-test routine. Upon successful completion of the self-test program, primary processor 210 automatically retrieves an application (or operating) program via Ethernet IF 216. The application (or operating) program is typically located in a memory associated with an ATM switch controller located elsewhere in ATM switch 101. Primary processor 210 then stores the application program in RAM 212. At the same time, primary processor 210 may store the application program in RAM 255 via I/O IF 252, communications bus 253 and memory selector 256. Thereafter, primary processor 210 and secondary processor 251 use the application programs stored in RAM 212 and RAM 255 to process the data traffic.

In an advantageous embodiment of the present invention, data traffic processing unit 250 is capable of testing its own operations without relying on primary processor 210 or the rest of ATM switch 101 being operational. The ability of secondary processor 251 to validate the operation of data traffic processing unit 250 avoids problems associated with using primary processor 210 to execute complex and extensive tests to debug data traffic processing unit 250 or with using hardware emulation circuits to debug data traffic processing unit 250.

To accomplish the foregoing, PLA 257 and memory selector 256 act as a memory controller to select either RAM 255 or ROM 254, depending on whether primary processor 210 and secondary processor 251 are operating in a "test" mode or in a regular "system" mode. PLA 257 determines the status of primary processor 210 and directs memory selector 256 to select either ROM 254 or RAM 255 accordingly. If primary processor 210 is in test mode, PLA 257 causes memory selector 256 to switch to the data paths of ROM 254, which contains a self-test program, thereby placing secondary processor 251 in test mode also. If primary processor 210 is in system mode (i.e., self-test has completed), PLA 257 causes memory selector 256 to switch to the data paths of RAM 255, which contains an application (or operating) program, thereby placing secondary processor 251 in system mode also. As stated above, primary processor 210 can control the system operation of secondary processor 251 by means of the application program that primary processor 210 stores in RAM 255.

Primary processor 210 may control the operating mode of secondary processor 251 by directing PLA 257 to select ROM 254 or RAM 255, according to primary processor 210 commands. PLA 257 may verify the status of primary processor 210 by reading a value from a dedicated register, referred to as the "MODE" register, in primary processor 210 to control the type of boot for secondary processor 251. PLA 257 reads the value stored in the MODE register to determine which memory to select.

For example, if the value read by PLA 257 from the MODE register in primary processor 210 is binary logic 0, then PLA 257 may select ROM 254 and secondary processor 251 will boot to a test program (test mode). If the value read by PLA 257 from the MODE register in primary processor 210 is binary logic 1, then PLA 257 may select RAM 255 and secondary processor 251 will boot to an operating program (system mode).

In an advantageous, primary processor 210 may use an interrupt signal on communications bus 253 to prompt PLA 257 to read the value in the MODE register in primary processor 210. This allows primary processor 210 to initiate a test mode in secondary processor 251 at any time during routine operation, not merely during a startup operation. Primary processor 210 can initiate a self-test operation in PLA 257 by setting the value in the MODE register in primary processor 210 to binary logic 0 (for example) and then using the interrupt signal to prompt PLA 257 to read the value in the MODE register in primary processor 210.

The inputs to PLA 257 and the logic programmed therein may be modified according to varying design criteria. By way of example, PLA 257 may receive a "POWER ON" reset signal from ATM switch 101 and a "START SELF TEST" signal from secondary processor 251, as well as the interrupt signal from secondary processor 251. The PLA 257 then may be programmed to automatically select ROM 254 (and therefore "test" mode) whenever the POWER ON reset signal is enabled, regardless of the value stored in the MODE register in primary processor 210. Alternatively, PLA 257 may be programmed to automatically select ROM 254 whenever secondary processor 251 detects an error in data traffic processing unit 250 and enables the START SELF TEST signal.

FIG. 3 is a flow diagram 300 illustrating the operation of data traffic processing unit 250 in accordance with one embodiment of the present invention. Initially, PLA 257 verifies the mode of primary processor 210 in response to an interrupt signal received from primary processor 210 or secondary processor 251 or in response to a power reset signal. PLA 257 can verify the mode of primary processor 210 by reading a value from a register in primary processor 210, or by monitoring a status signal generated by primary processor 210 (process steps 301 and 302).

If primary processor 210 is in system mode, secondary processor 251 executes the application program in RAM 255 (process step 303). If primary processor 210 is in test mode, secondary processor 251 executes the test program in ROM 254 (process step 304). If data traffic processing unit 250 or secondary processor 251 fail the test program, failure signals, such as LED lights or error messages, are generated by secondary processor 251 or primary processor 210 (process steps 305 and 306). If data traffic processing unit and secondary processor 251 pass the test program, secondary processor 251 executes the application program in RAM 255 (process step 303).

Thereafter, PLA 257 continually monitors to determine if a power reset signal or an interrupt signal from primary processor 210 is received. If neither is received, secondary processor 251 continues to process traffic data according to the application program received from primary processor 210 (process steps 308 and 303). If either a power reset signal or an interrupt signal is received, PLA 257 again verifies the mode of primary processor 210 and the process repeats (process steps 308 and 301).

Although the present invention has been described in detail, those skilled in the art should understand that they can make various changes, substitutions and alterations herein without departing from the spirit and scope of the invention in its broadest form.

What is claimed is:

1. For use in a data processing device containing a first processor and a second processor controllable by said first processor, a mode selection circuit capable of selecting an operating mode of said second processor comprising:

a mode determination circuit capable of determining a current operating mode of said first processor; and a mode control circuit coupled to said mode determination circuit capable of causing said second processor to operate in a first selected operating mode.

2. The mode selection circuit set forth in claim 1 wherein said second processor is coupled to a read-only memory (ROM) capable of storing a test program operable to test said second processor and a random-access memory (RAM) capable of storing an application program.

3. The mode selection circuit set forth in claim 2 wherein said mode control circuit causes said second processor to execute said test program in said ROM in response to a determination by said mode determination circuit that said first processor is in a test mode.

4. The mode selection circuit set forth in claim 2 wherein said mode control circuit causes said second processor to execute said application program in said RAM in response to a determination by said mode determination circuit that said first processor is in a system mode wherein said first processor processes data traffic under control of said application program.

5. The mode selection circuit set forth in claim 2 wherein said mode control circuit is a switch capable of coupling said ROM to data paths of said second processor.

6. The mode selection circuit set forth in claim 2 wherein said mode control circuit is a switch capable of coupling said RAM to data paths of said second processor.

7. The mode selection circuit set forth in claim 1 wherein said mode determination circuit determines said current operating mode in response to an interrupt signal received from said first processor.

8. The mode selection circuit set forth in claim 1 wherein said mode determination circuit determines said current operating mode in response to a power reset signal received from said data processing device.

9. An ATM switch comprising a frame relay conversion device capable of converting frame relay data frames received by said ATM switch into ATM cells, the frame relay conversion device comprising:

a first processor capable of processing said frame relay data frames;

a second processor controllable by said first processor and capable of processing said frame relay data frames; and a mode selection circuit capable of selecting an operating mode of said second processor comprising:

a mode determination circuit capable of determining a current operating mode of said first processor; and a mode control circuit coupled to said mode determination circuit capable of causing said second processor to operate in a first selected operating mode.

10. The ATM switch set forth in claim 9 wherein said second processor is coupled to a read-only memory (ROM) capable of storing a test program operable to test said second processor and a random-access memory (RAM) capable of storing an application program.

11. The ATM switch set forth in claim 10 wherein said mode control circuit causes said second processor to execute said test program in said ROM in response to a determination by said mode determination circuit that said first processor is in a test mode.

12. The ATM switch set forth in claim 10 wherein said mode control circuit causes said second processor to execute said application program in said RAM in response to a determination by said mode determination circuit that said first processor is in a system mode wherein said first processor processes data traffic under control of said application program.

13. The ATM switch set forth in claim 10 wherein said mode control circuit is a switch capable of coupling said ROM to data paths of said second processor.

14. The ATM switch set forth in claim 10 wherein said mode control circuit is a switch capable of coupling said RAM to data paths of said second processor.

15. The ATM switch set forth in claim 9 wherein said mode determination circuit determines said current operating mode in response to an interrupt signal received from said first processor.

16. The ATM switch set forth in claim 9 wherein said mode determination circuit determines said current operating mode in response to a power reset signal received from said data processing device.

17. For use in a data processing device containing a first processor and a second processor controllable by the first processor, a method of selecting an operating mode of the second processor comprising the steps of:

determining a current operating mode of the first processor; and in response to a determination of the current operating mode of the first processor, causing the second processor to operate in a first selected operating mode.

18. The method set forth in claim 17 wherein the second processor is coupled to a read-only memory (ROM) capable of storing a test program operable to test the second processor and a random-access memory (RAM) capable of storing an application program.

19. The method set forth in claim 17 wherein the second processor executes the test program in the ROM in response to a determination that the first processor is in a test mode.

20. The method set forth in claim 17 wherein the second processor executes the application program in the RAM in response to a determination by the mode determination circuit that the first processor is in a system mode wherein the first processor processes data traffic under control of an application program.

* * * * *